(12) United States Patent
Xu et al.

(10) Patent No.: US 10,837,864 B2
(45) Date of Patent: Nov. 17, 2020

(54) LARGE-AMPLITUDE VERTICAL-TORSIONAL COUPLED FREE VIBRATION SETUP FOR WIND TUNNEL TEST

(71) Applicant: Dalian University of Technology, Dalian (CN)

(72) Inventors: Fuyou Xu, Dalian (CN); Jing Yang, Dalian (CN); Donglei Zeng, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 16/481,427

(22) PCT Filed: Mar. 5, 2018

(86) PCT No.: PCT/CN2018/078004
§ 371 (c)(1),
(2) Date: Jul. 26, 2019

(87) PCT Pub. No.: WO2019/169527
PCT Pub. Date: Sep. 12, 2019

(65) Prior Publication Data
US 2020/0232875 A1    Jul. 23, 2020

(51) Int. Cl.
*G01M 9/02* (2006.01)
*G01M 9/04* (2006.01)
*G01M 9/08* (2006.01)

(52) U.S. Cl.
CPC ............... *G01M 9/04* (2013.01); *G01M 9/02* (2013.01); *G01M 9/08* (2013.01)

(58) Field of Classification Search
CPC .......... G01M 9/04; G01M 9/02; G01M 9/062; G01M 9/06; G01M 9/065; G01M 9/08;
(Continued)

(56) References Cited

U.S. PATENT DOCUMENTS

| 2,448,528 A | * | 9/1948 | Heuver | G01M 9/062 |
| | | | | 73/147 |
| 5,644,075 A | * | 7/1997 | Hefer | G01M 9/04 |
| | | | | 310/328 |

(Continued)

FOREIGN PATENT DOCUMENTS

| CN | 107345846 A | 11/2017 |
| CN | 107588923 A | 1/2018 |

(Continued)

OTHER PUBLICATIONS

Written Opinion PCT/ISA/237 dated Nov. 29, 2018 in PCT/CN2018/078004, with English translation, 9 pages.

(Continued)

*Primary Examiner* — Andre J Allen
(74) *Attorney, Agent, or Firm* — Muncy, Geissler, Olds & Lowe, P.C.

(57) ABSTRACT

An experimental setup for bridge deck large-amplitude vertical-torsional coupled free vibration in wind tunnel test, which belongs to the technical field of wind tunnel test apparatus. The experimental setup includes the rigid model, the rigid circular rods, the lightweight rigid circular sprockets, the chains, the linear tensile vertical springs, the bearings, the sliders, and the guides. For the new setup, large-amplitude vertical-torsional coupled free vibration of a rigid deck model that failed in conventional testing device can be adapted by the vertical deformation of the springs without any lateral tilt. As a result, the possible nonlinear mechanical stiffness due to the springs tilt in conventional testing device is excluded. In addition, owing to the low rolling friction and damping between the sprockets and the chains, the mechanical damping ratio of the system are quite low and stable for very large-amplitude vibrations.

5 Claims, 1 Drawing Sheet

(58) Field of Classification Search
CPC .......... G01M 17/007; G01M 17/0074; G01M 9/067; G01M 10/00; G01M 15/14; G01M 17/0072; G01M 13/027; G01M 17/0076; G01N 15/02; G01N 15/0205; G01N 25/02; G01N 33/28; G01N 11/02; G01N 13/00; G01N 15/10; G01N 19/02; G01N 2011/0093; G01N 2015/1062; A63G 2031/005; A63G 31/00; A63G 31/16
USPC .......................................................... 73/147
See application file for complete search history.

(56) References Cited

U.S. PATENT DOCUMENTS

| | | | | |
|---|---|---|---|---|
| 6,088,521 A | * | 7/2000 | Strumolo | G01M 9/08 703/8 |
| 2013/0186192 A1 | * | 7/2013 | Uehara | G01M 9/08 73/118.03 |
| 2018/0045601 A1 | * | 2/2018 | Hartmann | G01M 17/0074 |
| 2018/0335364 A1 | * | 11/2018 | Skube | G01M 9/04 |
| 2019/0195729 A1 | * | 6/2019 | Knestel | G01M 17/0074 |
| 2019/0219475 A1 | * | 7/2019 | Xu | G01M 9/062 |
| 2020/0072699 A1 | * | 3/2020 | Xu | G01M 9/04 |

FOREIGN PATENT DOCUMENTS

| | | |
|---|---|---|
| CN | 108444670 A | 8/2018 |
| JP | H09210839 A | 8/1997 |
| SU | 614669 A1 | 3/1981 |

OTHER PUBLICATIONS

Office Action dated Mar. 14, 2019 in corresponding CN Application 201810211949.4, with English translation, 12 pages.

* cited by examiner

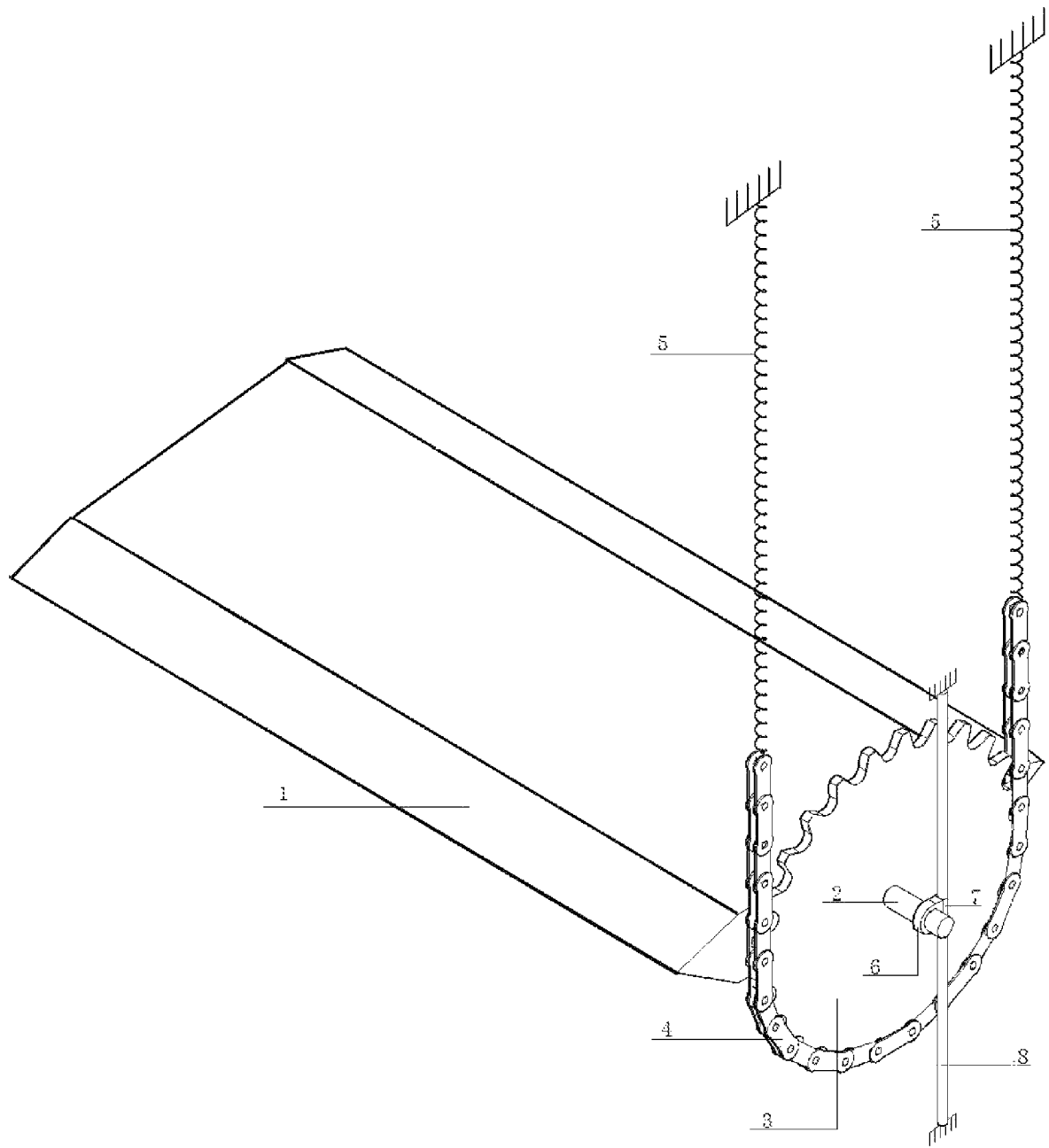

LARGE-AMPLITUDE VERTICAL-TORSIONAL COUPLED FREE VIBRATION SETUP FOR WIND TUNNEL TEST

TECHNICAL FIELD

The invention is a wind tunnel test setup which can realize large-amplitude vibration of bridge deck sectional model, and it can assure linear stiffness of vertical and torsional modes. The system includes linear vertical tensile springs for suspending rigid deck model, rigid circular sprockets connected with the model via rigid circular rods, high-strength chains connecting the springs with sprockets, bearings set on the rigid round rods, sliders fixed to bearings, and vertical guides. The large-amplitude vertical-torsional coupled free vibration of the rigid model can be transformed into the vertical deformation of linear springs. The linear vertical translational and torsional stiffness of the system can be realized by the linear tensile stiffness of springs and the rigid circular (the force arm length remain constant) sprockets. During the large-amplitude coupled vibration, the vertical and torsional stiffness, the system mass and inertia of moment, and the torsional arm length keep unchanged, and thus the vertical translational frequency and torsional frequency keep constants.

TECHNICAL BACKGROUND

In wind tunnel tests, the vertical-torsional coupled free vibration is one major method for deck vibration (vortex, buffeting, galloping, flutter) measurement and identification of flutter derivatives. For the traditional coupled free vibration testing device, the deck sectional model is suspended by springs, and the apparatus is very simple and convenient. For the small-amplitude coupled vibrations, the vertical springs tilt a little, and the springs vertical stiffness is approximately linear. However, for large-amplitude torsional vibrations, the vertical springs obviously tilt and the springs geometrical stiffness cannot keep linear. Therefore, the system vertical and torsional stiffness cannot keep constants, and they heavily rely on the amplitude. Consequently, unacceptable testing errors may be incurred. The larger vertical-torsional coupled vibration amplitude, the larger tilt of vertical springs, and the larger testing errors. It is generally considered that the error can be ignored when the torsional amplitude is lower than 2°. For large-amplitude torsional vibrations, e.g., when the old Tacoma Narrows Bridge was destroyed by wind loads, the torsional amplitude reaches amazing 35°. These wind-induced vibrations cannot be experimentally investigated by using the traditional testing device. Even the torsional amplitude only attains 10°, the results may be completely wrong.

SUMMARY

The invention can solve the following technical problem: In order to satisfy with the requirement of large-amplitude vertical and torsional coupled free vibration of sectional models of bridge deck and other structural members in wind tunnel test, a novel testing setup is proposed to effectively avoid various nonlinear factors involved in the traditional device and ensure large-amplitude vertical-torsional coupled linear free vibration. The new setup includes rigid deck model, rigid circular rods, rigid circular sprockets, chains, linear tensile vertical springs, bearings, sliders and guides.

The technical scheme of the invention:

A large-amplitude vertical-torsional coupled free vibration setup for wind tunnel test, includes rigid model 1, rigid circular rods 2, rigid circular hubs sprockets, chains 4, linear tensile vertical springs 5, bearings 6, sliders 7 and guides 8; The rigid circular rods 2 are fixed at both ends of the rigid model 1. The rigid circular rods 2 are perpendicularly passed through the center of the sprockets 3 and fixed to ensure that the torsional center of the rigid model 1 is coincide with those of the rigid circular rods 2 and the sprockets 3; The chains 4 mesh with the sprockets 3, and the two ends of the chains 4 are connected with the lower ends of the vertical springs 5. During the vertical-torsional coupled free vibration of both rigid model 1 and sprockets 3, there are not any slidings between sprockets 3 and chains 4. The rigid circular rods 2 are wrapped by bearings 6, and rigid circular rods 2 can freely rotate in bearings 6. The sliders 7 are fixed with the bearings 6, and the sliders 7 can slide freely along the fixed guides 8 on both ends, which restrict the lateral vibration of rigid model 1. When the rigid model 1 perform the vertical-torsional coupled free vibration, the springs 5 moving up and down, the rotations of sprockets 3 can be transferred to the springs 5 via chains 4, and the springs 5 only vertically deformend without any lateral tilt.

The diameter of sprocket 3 is determined according to several parameters such as system mass, inertia of moment, and the ratio of the torsional frequency to the vertical frequency, and is generally in the range of 0.2 m to 1.5 m.

The linear tensile stiffness of the chains 4 is much larger than those of the vertical springs 5. The chains 4 mesh fully with the sprockets 3, which ensure that there is no relative sliding between the chains 4 and the sprockets 3. And the friction damping should be as low as possible. For general rigid model 1, its mass and vibration frequency are not too high, and thus many chains on the market can meet the requirement.

The described sprocket 3 is unnecessarily a complete circular shape. Parts of sprocket 3 can be cut off to reduce its mass. During the whole vibration process, sprocket 3 should always partially mesh with parts of the chains 4. Another part of the chains 4 should keep upright together with the springs 5. In addition, under the condition that sufficient strength and rigidity of sprocket 3, its weight can be further reduced by drilling some holes in appropriate positions.

The rotation friction coefficient of the bearings 6 should be as small as possible, in order to reduce the torsional damping ratio of the system. Meanwhile, the bearings 6 are fixed with the sliders 7. During the vertical-torsional coupled vibration, the sliders 7 should be ensured to always move vertically along the guides 8.

The advantages of the invention: The deck rigid model vertical-torsional coupled vibration is realized by the vertical deformation of the springs. Due to the lateral restraint from the bearings, sliders, and guides, the rigid test model and springs cannot laterally vibrate, and requirement of the linear stiffness of vertical and torsional modes can be met. In addition, during the free vibration process, the following parameters keep unchanged: the linear tensile springs stiffness, the system mass and inertia of moment, the force arm length of the circular sprocket. Therefore, the system vertical and torsional stiffness and vibration frequencies keep constants. It successfully avoids the geometric nonlinearity and stiffness nonlinearity caused by the tilted springs in the traditional testing device. If only the single freedom of vertical vibration occurs, the four springs at the two ends of model have the same direction of flexible deformation. If only the single freedom of torsional vibration occurs, the two springs arranged at the two sides of each end have the opposite direction of flexible deformation, and the two springs on the windward or leeward side have the same direction of flexible deformation. If the coupled vertical and torsional vibration occurs, the four springs flexible deformations are linearly superimposed by the same and opposite direction. The testing setup has the following advantages: (1) Convenient installment and adjustment. The difficulty for installment is similar to that of the traditional device. (2) Simpler adjustment of initial angle of attack. It can be realized by using the method for traditional device. It can also be more conveniently set by pre-rotating the specified angle of the sprocket prior to the test. (3) Large-amplitude coupled free vibration tests that are impossible for the conventional devices can be conducted by using this new skill, which is the most significant advantage of the device. (4) The lateral vibration can be effectively restrained, which is another advantage of this setup (5) The rolling friction between the chains and sprockets is very small, and the corresponding mechanical damping ratio is very low. Even the torsional amplitude (one side) attains 20°, the mechanical damping ratio can be controlled lower than 0.5%.

DESCRIPTION OF THE DRAWINGS

The sole FIGURE is a structural diagram of vertical-torsional coupled free vibration device for deck rigid model in wind tunnel test.

1 rigid model; 2 rigid circular rod; 3 sprockets; 4 chain; 5 linear tensile vertical spring; 6 bearing; 7 slider; 8 guide.

DETAILED DESCRIPTION

Combining the technical scheme and attached drawing, the specific implementations of this invention are shown as follows:

As shown in the sole FIGURE, a large-amplitude vertical-torsional coupled free vibration setup for wind tunnel test is composed of rigid model 1, rigid circular rod 2, rigid circular sprockets 3, the chain 4, linear tensile spring 5, the bearing 6, the slider 7, and the guide 8; The rigid circular rods 2 are fixed at both ends of the rigid model 1. The rigid circular rods 2 are perpendicularly passed through the center of the sprockets 3 to ensure that the torsional center of the modell is coincide with those of the rigid circular rods 2 and the sprockets 3; The chains 4 mesh perfectly with the sprockets 3, and the two ends of the chains 4 are connected with the lower ends of the vertical springs 5 to prevent any relative sliding between the sprockets 3 and the chains 4 during the vertical-torsional coupled free vibration of rigid model 1 and sprockets 3; The lightweight rigid circular rods 2 are wrapped in the bearings 6, and rigid circular rods 2 can rotate freely in the bearings 6; The sliders 7 are fixed to the bearings 6, and the sliders 7 can freely slide up and down along the guides 8. The ends of the guides 8 are fixed rigidly in order to restrict the lateral vibration of rigid model 1 during the wind-induced large-amplitude vertical-torsional coupled free vibration. During the vertical-torsional coupled free vibration tests of rigid model 1, the linear tensile springs 5 vertically vibrate. The rotations of the sprockets 3 are transferred to the linear tensile vertical springs 5 via the chains 4, and the linear tensile springs 5 only generate vertical deformation without any lateral tilt.

The invention claimed is:

1. A large-amplitude vertical-torsional coupled free vibration setup for wind tunnel test, wherein the device includes a rigid model, two rigid circular rods, two sprockets, two chains, four linear tensile vertical springs, two bearings, two sliders, and two guides; the rigid model is connected with the two rigid circular rods at each end; the rigid circular rods are perpendicularly passed through the center of sprockets to ensure that a torsional center of the rigid model is on the same line with those of the rigid circular rods and sprockets; the chains mesh perfectly with the sprockets, and the two ends of the chains are connected with the lower ends of the linear tensile vertical springs to prevent any relative sliding between the sprockets and the chains during the vertical-torsional coupled free vibration of model and sprockets; the rigid circular rods are wrapped in the bearings, and rigid circular rods can rotate freely in the bearings; the sliders are fixed to the bearings, and the sliders can freely slide up and down along the guides; the ends of the guides are fixed rigidly in order to restrict the lateral vibration of rigid model during the wind-induced large-amplitude vertical-torsional coupled free vibration; during the vertical-torsional coupled free vibration tests of rigid model, the linear tensile springs vertically vibrate; the rotations of the sprockets are transferred to the linear tensile vertical springs via the chains, and the linear tensile springs only generate vertical deformation without any lateral tilt.

2. The large-amplitude vertical-torsional coupled free vibration setup for wind tunnel test according to claim 1, wherein the diameter of sprockets is determined according to several parameters such as the mass, inertia of moment, and the ratio of the torsional frequency to the vertical bending frequency of the rigid model, and is in the range of 0.2 m to 1.5 m.

3. The large-amplitude vertical-torsional coupled free vibration setup for wind tunnel test according to claim 1, wherein the sprockets are partly cut off to reduce the mass of the system; during the whole vibration, one part of the chains mesh with the sprockets, and the other part of the chains and the vertical springs vertically vibrate; wherein the sprockets are perforated to further reduce the mass in the premise that the stiffness and strength of the sprocket are enough.

4. The large-amplitude vertical-torsional coupled free vibration setup for wind tunnel test according to claim 1, wherein the rotate friction coefficient of the bearings are as low as possible in order to minimize the torsional damping ratio of the system; meanwhile, the bearings are fixed with the sliders to ensure that the sliders always move vertically along the guides during the vertical-torsional coupled vibration of rigid model.

5. The large-amplitude vertical-torsional coupled free vibration setup for wind tunnel test according to claim 3, wherein the rotate friction coefficient of the bearings are as low as possible in order to minimize the torsional damping ratio of the system; meanwhile, the bearings are fixed with the sliders to ensure that the sliders always move vertically along the guides during the vertical-torsional coupled vibration of rigid model.

* * * * *